United States Patent Office 3,167,123
Patented Jan. 26, 1965

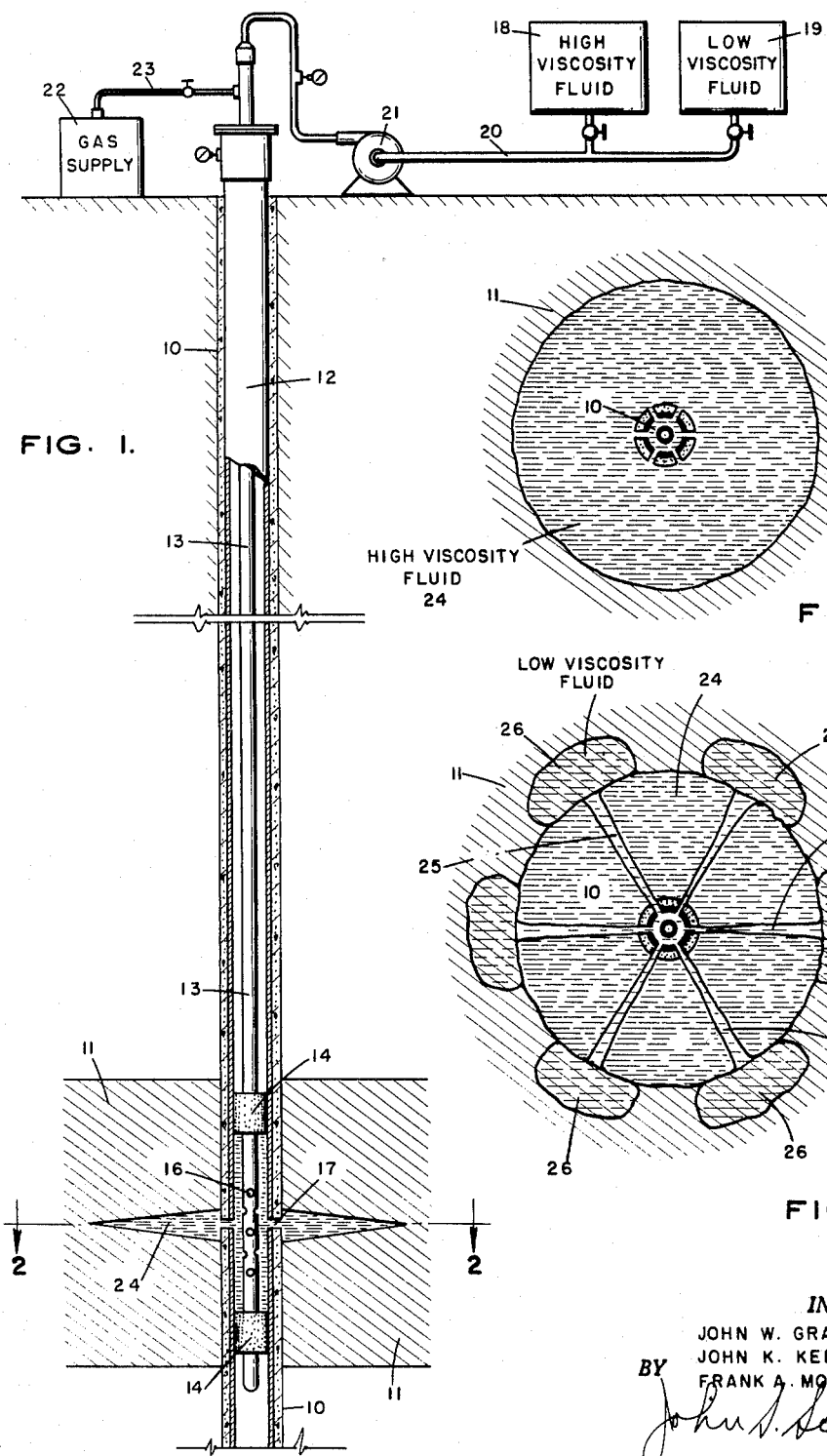

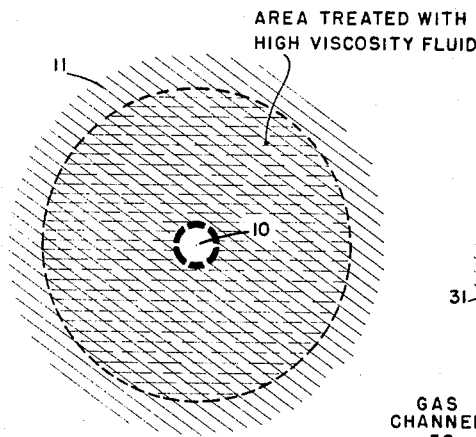
FIG. 4.
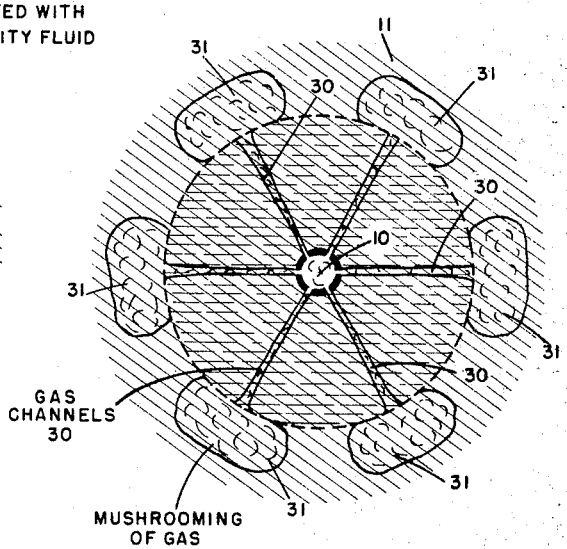
FIG. 5.
FIG. 7.
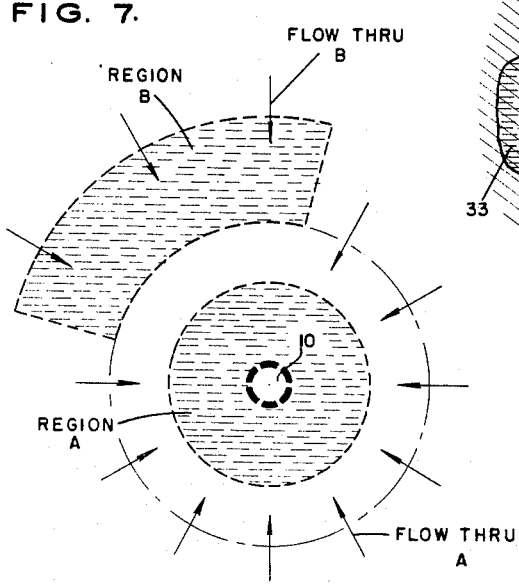
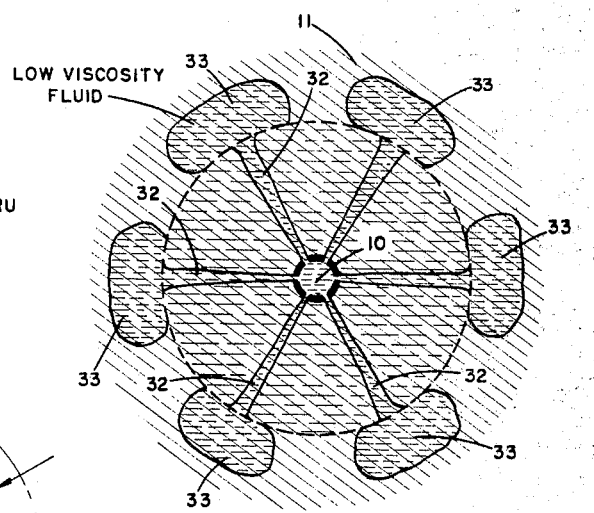
FIG. 6.
INVENTORS.
JOHN W. GRAHAM,
JOHN K. KERVER,
FRANK A. MORGAN, III,
BY
ATTORNEY.

3,167,123
METHOD OF ACIDIZING AND INTRODUCING A CORROSION INHIBITOR INTO A HYDROCARBON PRODUCING FORMATION
John W. Graham, Bellaire, and John K. Kerver and Frank A. Morgan III, Houston, Tex., assignors, by mesne assignments, to Jersey Production Research Company, Tulsa, Okla., a corporation of Delaware
Filed Sept. 7, 1961, Ser. No. 136,511
6 Claims. (Cl. 166—42)

This invention concerns improvements in well-known techniques for treating subsurface hydrocarbon-containing formations, in particular, corrosion inhibitor squeeze and acidization.

Essentially the method of the invention comprises injecting a large quantity of highly viscous fluid into the subsurface formation to be treated and then following the viscous fluid with injection of a low viscosity acid in the case of acidization or a low viscosity inhibitor solution in the case of corrosion inhibitor squeeze. The low viscosity fluid fingers through the higher viscosity fluid to form radial channels in the region permeated by the higher viscosity fluid. In a modification of this technique, gas is injected between placement of the high and low viscosity fluids to enhance the formation of fingers by the lower viscosity fluid.

In the acidization technique, in effect, lateral drain holes are formed in the hydrocarbon productive formation and these have long been recognized as of great value in well stimulation. The mechanics of the process are: first the well bore is surrounded with high viscosity liquid and then the low viscosity acid is injected and it fingers through the higher viscosity liquid. By choosing properly the reaction rate and the injection rate of the low viscosity acid, the reaction between the acid and the formation material is easily controllable and can be confined to the volume of the fingers that form through the high viscosity liquid. Thus, by this process of directional acidization, lateral drain holes of very high permeability are created. By injecting gas ahead of the acid, improved results are obtained because the most favorable viscosity ratio for the creation of long, narrow fingers is achieved. The long, narrow, permeable fingers formed by the gas reach out from the well bore and provide channels for the later injected acid.

The corrosion inhibitor squeeze technique designed to obtain corrosion protection is relatively new, and although it is readily adaptable to tubingless and multiple completions and hence has gained rapid acceptance in the field, two aspects of the process need improvement. First, there is a need to reduce the amount of formation damage (lost productivity) which sometimes occurs with this process, and, second, there is a need to extend the inhibition life of a given size treatment. The improved well-treating technique of the invention achieves these ends. Thus, formation damage is reduced because the region of adsorption of the corrosion inhibitor does not completely surround the well bore, and any formation damage incurred in the treatment affects only that fraction of the well productivity associated with the flow of reservoir fluid through the region treated. In this manner, loss of productivity for a given size treatment is reduced. The inhibition life is extended also through the unique pattern of placement afforded by the process of the invention. Since the concentration of desorbed corrosion inhibitor in the produced oil is dependent upon the volume rate of flow through the region of adsorption and since the process reduces the flow rate across the region of adsorption, the desorption rate of corrosion inhibitor is diminished and the effective life of the treatment is increased.

A primary object of the invention is to provide an improved method for treating subsurface formation and especially to improve the effectiveness of the acidization technique and to improve the corrosion inhibitor squeeze technique.

This object and other objects and advantages of the invention will be apparent from a more detailed description thereof when taken in conjunction with the drawings wherein:

FIG. 1 is a diagrammatic view of the earth's cross section showing a borehole penetrating a subsurface productive formation and fluid injection equipment arranged in the well bore and on the earth's surface;

FIG. 2 is a view taken along lines 2—2 of FIG. 1 and illustrates the condition of the formation following injection of the highly viscous fluid;

FIG. 3 is a view similar to that of FIG. 2 showing the condition of the formation following injection of the low viscosity acid or corrosion inhibitor;

FIG. 4 is a view similar to that shown in FIG. 2 except that it relates to an unfractured formation;

FIG. 5 is a view similar to that shown in FIG. 4 and includes the step of injecting gas following injection of the highly viscous fluid;

FIG. 6 is a view similar to that shown in FIGS. 4 and 5 and illustrates the further step of injecting the low viscosity fluid following injection of the gas; and FIG. 7 diagrammatically illustrates the improvement achieved by the method of the invention for the corrosion inhibitor squeeze technique over the unmodified corrosion inhibitor squeeze technique.

Referring to the drawings in greater detail, in FIG. 1 is shown a borehole 10 penetrating a subsurface hydrocarbon-containing productive formation 11. A casing pipe 12 is cemented in borehole 10. A tubing 13 extends from the earth's surface to adjacent formation 11 and it is provided with straddle packers 14 and ports 16 located between packers 14. Casing 12 and formation 11 are perforated as indicated at 17. At the earth's surface a source of high viscosity fluid 18 and a source of low viscosity fluid 19, either acid or corrosion inhibitor solution, connect to a conduit 20 which in turn leads to the interior of tubing 13 through pump 21. A suitable gas supply 22 connects to tubing 13 through conduit 23. The operation of the invention is as follows:

Formation 11 is perforated as at 17. After perforating, formation 11 may or may not be hydraulically fractured depending upon the conditions of formation 11. As illustrated in FIG. 1, the formation has been fractured. After fractures have been formed, a highly viscous fluid such as viscous crude oil is pumped into formation 11 from source 18 by means of pump 21 through conduit 20 and tubing 13. The viscous fluid spreads through the formation and forms a generally circular front with irregular boundaries surrounding borehole 10 as is seen in FIG. 2. If desired, a high viscosity fluid may be used to fracture the formation and, in that case, it would not be necessary to inject additional high viscosity fluid for the fracture fluid itself could be used as the medium through which the later fingering occurs. Once the high viscosity fluid, which may range between 2 and 500 barrels of viscous crude oil, is in place, the low viscosity fluid from source 19 is injected into formation 11 in a similar manner, that is, through conduit 20 and tubing 13 by means of pump 21 to form radial channels or fingers 25 in the highly viscous fluid 24. Upon reaching the outer egde of the highly viscous fluid 24, the low viscosity fluid mushrooms as at 26. In the case of the low viscosity fluid being used for the acidization process, hydrochloric acid would be used if formation 11 were limestone and hydrofluoric acid would be used if formation 11 were sandstone.

To enhance the fingering effect, following the injection of the high viscosity fluid, a quantity of gas, as for example 500–25,000 s.c.f. of gaseous nitrogen, may be injected from gas supply 22 to conduit 23 and tubing 13 into formation 11. FIG. 4 illustrates a region filled with viscous fluid which has not been previously fractured. FIG. 5 illustrates the condition of the formation upon injection of gas through the region filled with highly viscous fluid. The gas forms long, narrow radial fingers or channels 30 extending from borehole 10 to the periphery of the highly viscous oil area where the gas mushrooms as at 31. FIG. 6 illustrates the succeeding operation. Once the gas has channeled through the highly viscous oil, injection of gas is halted and the low viscosity treating fluid, i.e., acid or inhibitor, is injected into the formation as previously described to form widened channels 32 along the channels 30 formed earlier by the gas. The low viscosity liquid mushrooms as at 33 as described heretofore.

In the corrosition inhibitor squeeze technique the highly viscous fluid injected prior to the inhibitor solution injection allows the low viscosity corrosion inhibitor solution to finger through to and adsorb on a volume of formation some distance from the well bore as shown by the mushrooming portion at the end of the channels. FIG. 7 illustrates the improvement obtained through the technique of the invention as to corrosion inhibitor use. Adsorption of corrosion inhibitor in region B gives protection for a longer period of time than an equal amount of corrosion inhibitor adsorbed in region A where the volume of region A equals the volume of region B. This is so because the volume rate of flow through B is only a fraction of that through A.

Having fully described the objects, elements and method of our invention, we claim:

1. A method for treating hydrocarbon-containing subsurface formations penetrated by a borehole comprising: injecting a highly viscous fluid into said formation to surround the well bore with a region of highly viscous fluid and then injecting a low viscosity fluid into the region of highly viscous fluid in said formation in a manner so as to provide radial fingers of low viscosity fluid extending from the borehole completely through the region contacted by the highly viscous fluid through which reservoir fluids may be produced.

2. A method as recited in claim 1 in which the low viscosity fluid consists essentially of an acid.

3. A method as recited in claim 1 in which said low viscosity fluid consists essentially of a corrosion inhibitor solution.

4. A method for treating hydrocarbon-containing subsurface formations penetrated by a borehole comprising: injecting a highly viscous fluid into said formation to surround the well bore with a region of highly viscous fluid; injecting a gas into said region of said formation filled with the highly viscous fluid to cause said gas to finger completely through the region contacted by the highly viscous fluid; and then injecting a low viscosity liquid into the formation in a manner so as to provide channels of low viscosity fluid along the fingers formed by the previously injected gas.

5. A method as recited in claim 4 in which the low viscosity liquid consists essentially of an acid.

6. A method as recited in claim 4 in which the low viscosity liquid consists essentially of a corrosion inhibitor solution.

References Cited in the file of this patent

UNITED STATES PATENTS

| | | |
|---|---|---|
| 2,018,199 | Carr et al. | Oct. 22, 1935 |
| 2,048,362 | Stoesser et al. | July 21, 1936 |
| 2,053,285 | Grebe | Sept. 8, 1936 |
| 2,804,145 | Holbrook | Aug. 27, 1957 |
| 2,814,347 | MacKnight | Nov. 26, 1957 |
| 3,044,550 | Eilers | July 17, 1962 |